United States Patent Office 3,121,720
Patented Feb. 18, 1964

3,121,720
1-SUBSTITUTED TETRAHYDRO ISOQUINOLINES AND PROCESS FOR PREPARING THE SAME
Derek Harold Richard Barton, London, Benjamin Arthur Hems, Ickenham, Thomas Walker, Wembley, Alexander Crawford Ritchie, Harrow, and Rupert Frederick Keith Meredith, North Harrow, England, Percy George Holton, Mexico City, Mexico, and Dennis Edward Clark, Chalfont St. Peter, and Godfrey Basil Webb, Greenford, England, assignors to Glaxo Group Limited, Greenford, England, a British company
No Drawing. Filed July 1, 1960, Ser. No. 40,200
Claims priority, application Great Britain July 8, 1959
7 Claims. (Cl. 260—288)

This invention concerns a novel process for the production of intermediates of use in the production of alkaloids and related compounds of the isoquinoline series and to the novel intermediates in such processes. More particularly but not exclusively the invention is concerned with novel methods for the synthesis of 1-substituted-tetrahydro isoquinolines and other compounds of related structure.

Alkaloids and related synthetic compounds of the isoquinoline series, in particular those containing the benzoquinolizine ring structure, are well known in chemotherapy. Thus, for example, the alkaloid emetine is widely used in Asia and Africa to combat amoebic dysentery. Other related compounds include cephaleine, psychoterine and emetamine, while dehydroemetine has been reported as having useful pharmacological activity. It is thus an object of the invention to provide new methods useful in the preparation of pharmacologically active compounds possessing the basic benzoquinolizine ring structure as well as other useful compounds.

Our new synthetic process is based upon the initial reaction of a dihydroisoquinoline with a compound containing a reactive methine group, that is, a group =CH—Y where Y is a group able to activate the hydrogen atom of the CH—Y group.

Compounds containing reactive methine groups are well known in chemistry, being used in various reactions, the hydrogen atoms of such methine groups being activated by an electronegative group which is frequently a carbonyl or cyano group.

It will be appreciated that where a compound possesses two reactive methine groups it is possible to react one molecule of compound II with two molecules of the dihydroisoquinoline. Preferably the two reactive methine groups are equally activated as in a symmetrical compound such as acetone dicarboxylic acid. Thus

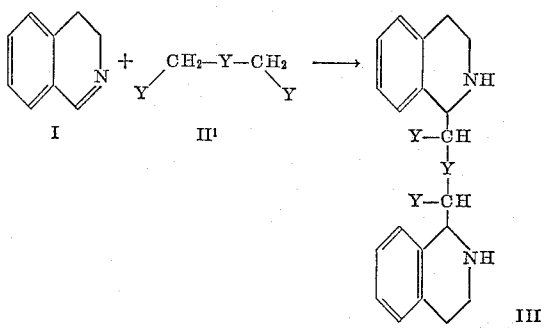

(where the groups Y are activating groups such as carbonyl groups).

As used in this specification, the term reactive methine group of course includes reactive methyl and methylene groups.

According to the present invention, therefore, we provide a process for the preparation of 1-substituted 1,2,3,4-tetrahydroisoquinolines in which a 3,4-dihydroisoquinoline compound is reacted with a compound XH, the hydrogen atom of which together with the carbon atom to which it is attached constituting a reactive methine group, whereby the group X adds onto the 1-position of the said dihydroisoquinoline.

The compound X–H is preferably of the general formula R′R″CH.COR‴ where R′, R″ and R‴ are organic groups or hydrogen atoms, R″ being preferably a hydrogen atom.

As indicated above, when bis-isoquinolinoid derivatives are required, the compound XH should carry a further active methine group the hydrogen atom of which is activated so that on reaction with the dihydroisoquinoline the methine carbon atoms are attached to separate tetrahydroquinoline moieties.

In order to produce compounds possessing the benzoquinolizine ring structure referred to above, the 1-substituent may be cyclised conveniently with an appropriate group introduced onto the N-atom.

Thus, for example, the compounds of Formula III may then be reacted with an appropriate compound to introduce onto the nitrogen atom a group which undergoes ring closure with the group attached at the 1-position.

Illustratively, where the active methine compound is a carbonyl compound of formula R—CH$_2$—CO—R$^1$ (where R and R$^1$ are organic groupings) the resulting compound will have the general formula

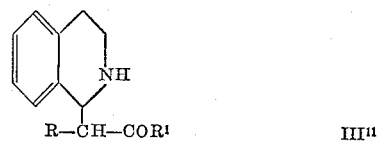

Reaction of the compound of Formula III$^{11}$ with an anhydride (R$^3$—CH$_2$—CO)$_2$ or an equivalent acylating compound gives rise to a compound of formula

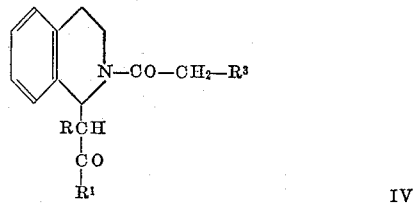

which on cyclisation forms a mixture of cyclic amides of formula

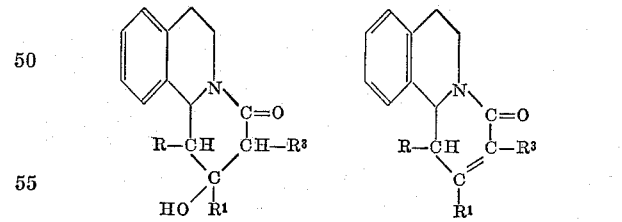

and

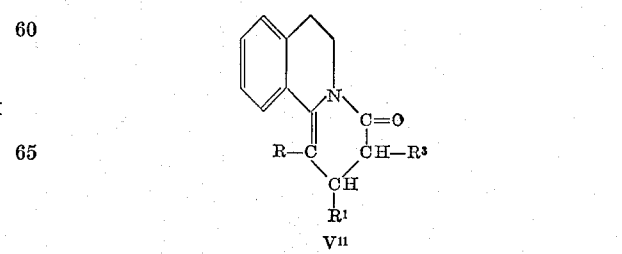

Compound V can be dehydrated to compound V$^1$, which may rearrange to give compound V$^{11}$ in which the double bond is conjugated with the aromatic system. The double bond of compounds V¹ and V¹¹ may be reduced, together with the amide grouping to give a compound of skeletal structure

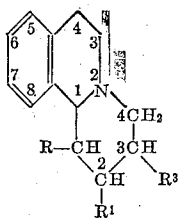

V namely the required benzoquinolizine ring system.

Reaction of a compound of Formula III¹¹ with a vinyl ketone $R^4$—CO—CH=CH$_2$ (where $R^4$ is an organic group) gives rise to a compound of formula

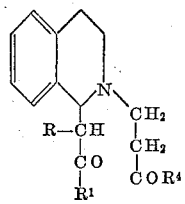

VII which on ring closure gives a cyclic alcohol of formula

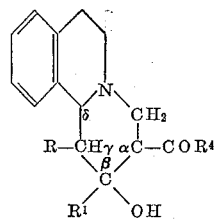

VIII

Compounds V¹ and VIII in the above synthetic routes may also be converted to unsaturated alkaloids such as dehydroemetine which has recently been synthesised by Brossi et al. (Helv. Chem. Acta, 42, 772 (1959)) and which is claimed to possess biological activity at least as great at emetine. Thus compound VIII may be subjected to Wolf-Kischner reduction to reduce the keto group to methylene.

By way of example, the application of the above reaction sequence to the specific problem of the synthesis of emetine takes place by alternatives (1) and (2) as follows:

(1) Via acid anhydride route:

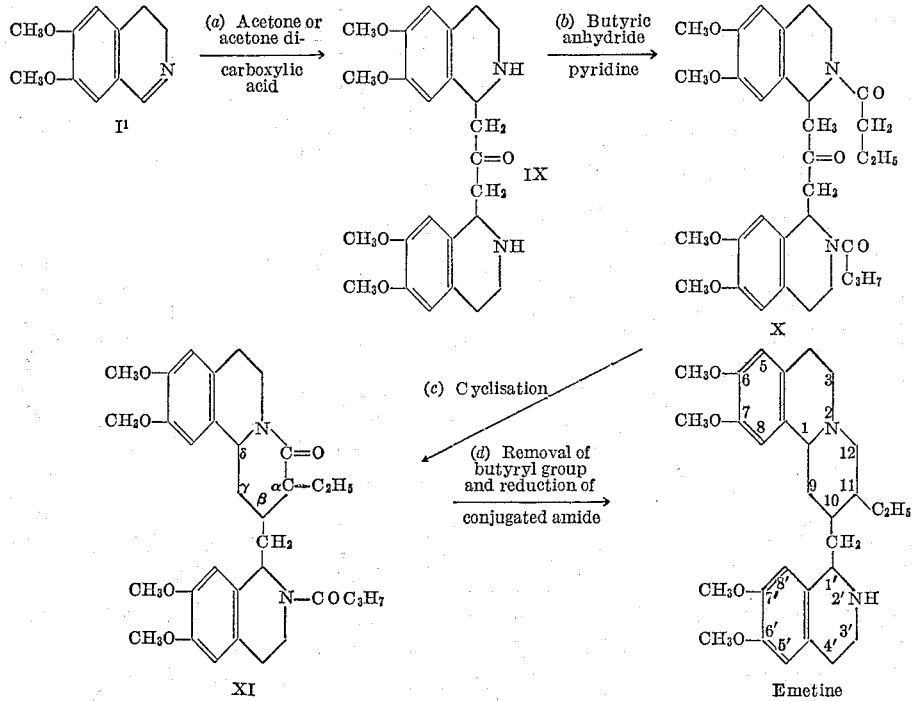

(2) Via vinyl ketone route:

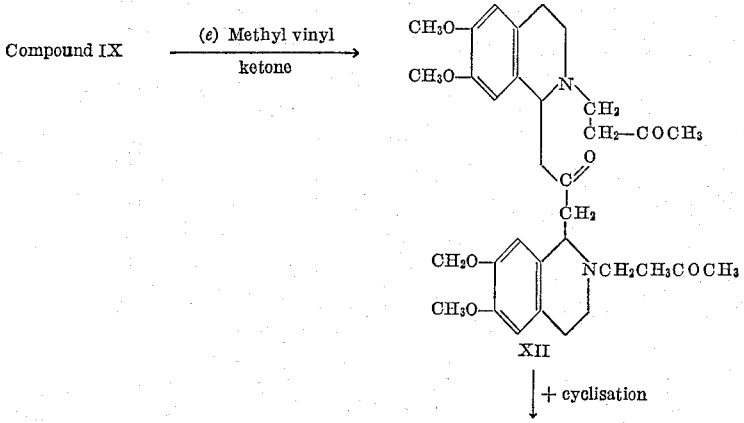

↓ + cyclisation

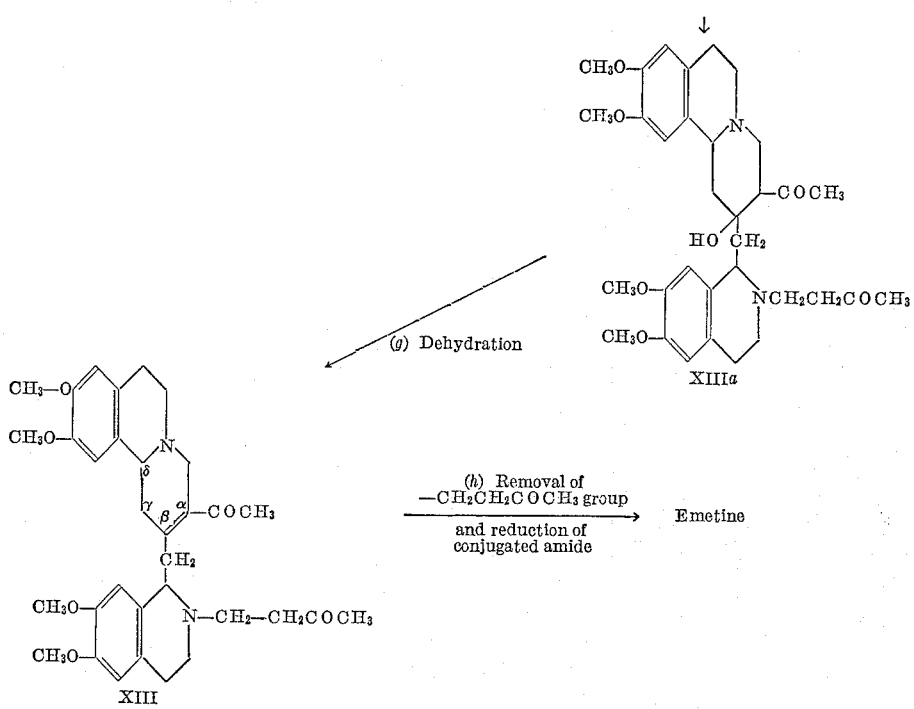

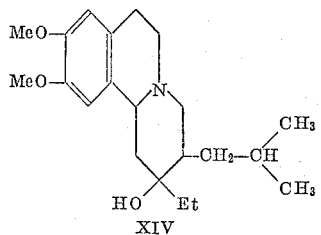

XIII

In route (1) the cyclisation step (c) may give rise to the α:β unsaturated compounds XI shown, in admixture with the respective γ:δ-unsaturated compound (herein designated compound XIA) and possibly also the β-hydroxy saturated compound (herein designated compound XIB). The α:β and γ:δ unsaturated compounds may be reduced, after removal of the butyryl group, to emetine but the β-hydroxy saturated compound should be dehydrated to give one or both of the unsaturated compounds, preferably after isolation, before proceeding as described above.

Another benzoquinolizine derivative which possesses valuable pharmacological properties is the compound of formula

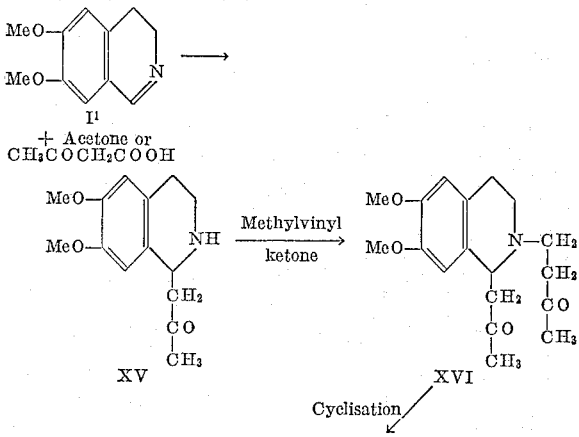

XIV which has been shown to have reserpine-like activity (cf. A. Pletscher and H. Besendorf, Science, 1959, 129, 844).

The routes outlined above provide a convenient method for the synthesis of compounds analogous to this, for example by the following reaction scheme:

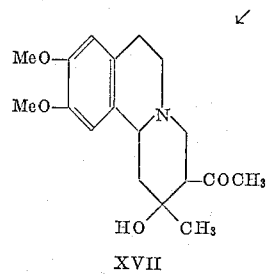

XVII

As can be seen compounds of the Formula III as well as compounds of Formulas IV–VIII inclusive, all of which compounds are novel, represent valuable intermediates for the synthesis of various alkaloids and compounds of interest.

We will now describe in detail the reactions involved in the processes according to the invention.

The reaction of dihydroisoquinoline (1) with reactive methyl or methylene compounds.

For this reaction 3:4-dihydroisoquinoline or substitution products thereof having one or more substituents in the 3,4,5,6,7 and/or 8-position may be used. The nature of the substituents should of course be such as not to react with the reactive methylene compound and will be chosen having regard to the nature of the substituent or substituents present in the alkaloid or other compound it is desired to synthesise. Suitable substituents are thus for example alkyl, aralkyl, aryl, alkenyl, alkoxy, aralkoxy, aryloxy, nitro, hydroxyl, thio, alkyl, aralkyl- or aryl thio, carboxyl, carbalkoxy, acyl or tertiary amino groups or halogen or hydrogen atoms. Substituents may also occupy more than one position, as in methylene dioxy groups. The 3 and 4 positions may in general carry any of the above groups where the other reactant is acetone dicarboxylic acid, but with acetone it is preferable that the 3 and 4 positions be unsubstituted or carry only substituents which do not reduce the electron attraction of the 2-nitrogen atom. Keto groups are preferably not present in the 3 or 4 positions since the 3 and 4-ketones are equivalent to 3 and 4-hydroxy isoquinolines which do not react with reactive methylene groups. The 1 position is preferably unsubstituted. Substituents which cause steric hindrance at the site of reaction are also to be avoided: thus, large groups in the 8-position tend to hinder the reaction.

Preferred groups in the aromatic ring are alkoxy and methylenedioxy groups, especially methoxy groups in the 6- and 7-positions.

For the specific purpose of synthesising emetine the 6:7 dimethoxy-3:4-dihydroisoquinoline is used.

The reactive methine compound XH can be any compound having a methyl, methylene or methine group activated, for example, by an adjacent carbonyl group, nitrile, nitro group etc. such that the hydrogen atom of the methylene group is labile and compounds of this nature are of course well known to those skilled in the art. It is generally found that a methine group activated by a single activating group reacts only weakly with the dihydroisoquinoline and that compounds having two groups activating the methine group are more reactive. Thus acetoacetic acid is more reactive than ethyl acetate, which scarcely reacts at all, and acetone dicarboxylic acid is more reactive than acetone.

Illustrative of reactive methine compounds are ketones such as acetone, acetylacetone, keto acids, e.g. acetone dicarboxylic acid, acetoacetic acid, various esters, e.g. malonic esters, keto acid esters, certain acids such as malonic acid and cyanides, e.g. benzyl cyanide.

In the case of emetine and its analogues acetone or acetone dicarboxylic acid may be used to form the bis-adduct, compound IX described above.

This reaction is preferably carried out in the presence of a solvent medium and advantageously also in the presence of an acid. Where acetone is one of the reactants, an excess of this substance may serve as reaction medium. Further, since acetone dicarboxylic acid is considerably more reactive than acetone, when this acid is reacted with 6:7 dimethoxy-3:4-dihydroisoquinoline, it is possible to use acetone as reaction medium, although other solvents, for example, pyridine or alcohols such as methanol may be used. Water may also be present. As stated above, it is generally advantageous to carry out the reaction in the presence of acid, although this is not essential since a high yield of compound IX may be obtained in aqueous methanol without added acid.

The solvent system in which this reaction is carried out appears to have a profound effect upon the efficiency of the reaction, as does also the ratio of the reactants and the presence or absence of added acid. Thus, where 6:7-dimethoxy-3:4-dihydroisoquinoline and acetone dicarboxylic acid are reacted in acetone in equimolar quantities at room temperature no compound IX can be isolated, although it is possible to isolate the mono-acetone adduct compound XV above which is a valuable intermediate.

Acylation and chromatography to recover the N-N diacyl derivative however, leads to a 15% yield. On the other hand, it is often the case that an intermediate compound is precipitated, again in about 15% yield, which compound gives compound IX on heating with dilute alkali and is probably a carboxylated derivative. Acetylation or butyrylation of this intermediate leads to the diacetyl or dibutyryl derivative of compound IX, so that the intermediate can, if desired, be used in the synthesis of emetine by the butyrylation method. In pyridine the reactants in equimolar ratio give only a product which cannot be isolated but which gives an acyl derivative of compound IX on acylation.

In both acetone and pyridine the use of the stoichiometric ratio of the reactants, namely 2 mols. 6:7 dimethoxy-3:4-dihydroisoquinoline to to 1 mol. acetone dicarboxylic acid, appears to give no isolatable compound IX but if the reactants are reacted in the stoichiometric ratio in pyridine, and sulphuric acid is added as catalyst, it is possible to obtain as much as 32 to 40% of compound IX.

In acetone, using equimolar quantities of the reactants and using sulphuric acid as a catalyst, the yield is about 30%.

The reaction appears to run more smoothly if water is present and thus in 25% aqueous acetone with added sulphuric acid and the 2:1 ratio of the dihydroisoquinoline to acetone dicarboxylic acid, as much as 60% of compound IX can be obtained while in 80% aqueous methanol with the 2:1 ratio and without added acid the reaction is very smooth and again yields as much as 60% compound IX.

The addition of acid does appear to be beneficial, however, since in 80% aqueous methanol with the 2:1 ratio of reactants an added hydrochloric acid approximately 70% of compound IX may be obtained.

In all the methods discussed above for the production of compound IX, the final product has been a mixture of isomers. Since compound IX possesses two asymmetric carbon atoms, namely the 1-carbon atoms of each of the tetrahydroisoquinoline rings, and is symmetrical about the central carbonyl group, two stereoisomeric forms exist, namely a racemic mixture of dextro- and laevo-rotatory optical isomers, and the meso form.

Emetine itself exists in sixteen optically active forms since, in addition to the two asymmetric carbon atoms derived from compound IX, it also possesses two further asymmetric carbon atoms in the additional ring.

In the synthesis of any given stereoisomeric form of emetine it is necessary to start from a single form of compound IX and where a preparative method leads to a mixture of the isomers of compound IX, these should desirably be separated.

Separation may conveniently be effected by taking advantage of the differing solubilities of the hydrochlorides of the two principal stable forms of compound IX. For convenience, the two stereoisomers of compound IX are designated A and B and we have proved that A is the racemic and B the meso form. Recent determinations of the absolute configuration of emetine (e.g. A. R. Battersby and S. Garratt, Proc. Chem. Soc., 1959, 86) suggest that the meso form of (IX) corresponds to natural emetine.

We find that the hydrochloride of compound IXA is substantially insoluble in ethanolic hydrogen chloride while that of compound IXB is soluble and this solubility difference can be used to separate a mixture of the two forms. It is also possible to add saturated ethanolic hydrogen chloride to the reaction mixture to precipitate compound IXA hydrochloride directly.

Alternatively, it is possible to carry out the reaction in such a way that compound IXB is the principal product since the B form seems to be slightly more stable than the A form.

Thus, when 6:7-dimethoxy-3:4-dihydroisoquinoline is reacted in 2:1 ratio acetone dicarboxylic acid in 80% aqueous methanol in the presence of sulphuric acid the initial product is an intermediate precipitate which on resuspension at pH 10 in aqueous sodium bicarbonate yields compound IXB. The remaining reaction solution can be worked up to give a mixture of compounds IXA and IXB. The intermediate precipitate appears to be a sulphuric acid salt of compound IXB.

Compound IXA can also be converted in good yield into IXB, by suspending IXA in aqueous sulphuric acid, whereby it is gradually converted to the compound described above which on treatment with base as before then gives compound IXB.

The isomers of compound IX can be converted to isomers emetine by either of the routes described above, that is by the acid anhydride route or by the vinyl ketone route.

Referring to the reaction sequence given above for the acid anhydride route, step (b) in that route may be carried out, in any convenient way, for example by reaction of compound IX with butyryl chloride in the presence of an acid binding agent. We have found that butyric anhydride in the presence of pyridine, however, is particularly convenient and is able to acylate the nitrogen atom in almost quantitative yield.

Referring to the reaction sequence given above for the vinyl ketone route, step (e) which comprises the reaction of methyl vinyl ketone with compound IX may be carried out in any convenient way; the reaction is, in general, quite facile and may often be carried out in the absence of catalyst e.g. by simply mixing the reactant compounds in a common solvent.

Referring to the cyclisation steps (c) and (f) in the two reaction routes, the cyclisation can be effected in principle with alkaline or acidic catalysts, suitable alkaline catalysts being, for example, alkali metal alkoxides, e.g. sodium methoxide, potassium t-butoxide etc. and sutiable acid catalysts being strong acids e.g. hydrochloric acid, sulphuric acid etc. The conditions for effecting the cyclisation vary from case to case, however, as explained hereafter.

Step (c) in the acid anhydride route, the cyclisation step may be carried out under the conditions generally used for condensation of a carbonyl group with a reactive methylene group. In this case the reactive methylene group is that adjacent to the N-acyl carbonyl group. The cyclisation is preferably carried out in the presence of a cyclising agent.

The nature of the cyclising agent influences the composition of the mixture of cyclic amides produced. We find that in this cyclisation, alkaline cyclising agents are advantageous and produce predominantly unsaturated cyclic amides. We have further found that strong cyclising agents, such as potassium tertiary butoxide, tend to produce more $\gamma:\delta$-unsaturated amide than $\alpha:\beta$-unsaturated amide while weaker agents produce more $\alpha:\beta$ compound.

Step (f) in the vinyl ketone route, the cyclisation step, again comprises reaction of a carbonyl group with a reactive methylene group. In this case the methylene group is activated by the adjacent carbonyl group of the acetyl group in the acetyl ethyl side chain. The cyclising agent in the cyclisation of mono-tetrahydroisoquinolyl derivatives may be in general be, for example, hydrochloric acid or an alkaline reagent such as sodium methoxide.

We have found that hydrochloric acid tends to produce larger quantities of the $\beta$-hydroxy saturated compound than do alkalinic reagents. Further, alkaline reagents under mild conditions, for example sodium methoxide in benzene at room temperature, produce predominantly $\beta$-hydroxy saturated products while under vigorous conditions, for example sodium methoxide under reflux, they produce predominantly the $\alpha:\beta$-unsaturated compound. Although the carbonyl groups of the acetylethyl side chain is also capable of reacting with the methylene groups on either side of the carbonyl group which originally derived from acetone or acetone carboxylic acid, the compounds described appear to be the principal products.

The bis-tetrahydroisoquinolyl derivatives e.g. compound XII, however, tend to give polymeric material under vigorous conditions and cyclisation is preferably achieved under very mild alkaline conditions to yield a cyclic alcohol.

In order that the invention may be well understood we give the following examples by way of illustration only:

EXAMPLE 1

*Preparation of the B Isomer of $\alpha$-Bis(1:2:3:4-Tetrahydro 6:7-Dimethoxyisoquinol-1-yl) Acetone (Compound IX)*

3:4-dihydro-6:7-dimethoxyisoquinoline (18.0 g.) was dissolved in methanol (36.0 ml.) and water (144.0 ml.) added. To this solution was added a solution of acetone dicarboxylic acid (7.2 g.) in aqueous sulphuric acid (conc. sulphuric acid (1.8 ml.) in water (36.0 ml.)). A steady evolution of carbon dioxide occurred and the mixture was allowed to stand at room temperature for 18 hrs. During this time a solid separated from solution. The reaction mixture was diluted with water and this solid (B precursor) filtered off. The wet solid was suspended in water (250 ml.) and the mixture adjusted to pH 10 by the addition of aqueous sodium carbonate. The resulting white suspension was stirred at room temperature for 2 hours, then the solid filtered, washed with water, and dried at room temperature in vacuo over a dessicant, to give 10.92 g. of compound IXB (52.7% theory) M.P. 144–145° C.

Found: C, 67.81; H, 7.53; N, 6.32. $C_{25}H_{32}O_5N_2$ requires C, 68.16; H, 7.32; N, 6.36%.

The aqueous solution remaining, after the removal of B precursor by filtration, can be worked up to yield a further amount of mixed compounds IXA and B in the following way.

Aqueous sodium carbonate was added to adjust to pH 10, and the solution was extracted with methylene chloride (3 x 75 ml.). The first two extracts were combined and washed with water (3 x 150 ml.) the water washes being back extracted with the third methylene chloride extract. Removal of all the solvent in vacuo from the combined methylene chloride extracts left a pale red oil, which was triturated with warm ether and dried in vacuo at room temperature to give an additional 3.41 g. (16% theory) of crude mixed compound IXA and B isomers, M.P. 114–115°.

The B precursor, on drying, has M.P. 137–9° (d.). Analysis indicated that it was probably a sulphuric acid salt of the free compound IX containing some water of crystallization.

EXAMPLE 2

*Preparation of Pure Compound IXA*

This can either be obtained by separating a mixture of compounds IXA and IXB via their hydrochlorides (method (a) below) or by carrying out the initial reaction under conditions where compound IXA hydrochloride alone crystallises from the reaction mixture (method (b) below).

(a) The mixture of compounds IXA and IXB isomers (3.41 g.) obtained from the mother liquors of the preparation of pure IXB (see above) was suspended in industrial methylated spirit. (25 ml.) and saturated ethanolic hydrogen chloride added till the pH was 1.0.

The reaction mixture was allowed to stand at 0° for 1½ hours, and the resulting solid filtered. It was then refluxed for 5 mins. in industrial methylated spirit. (20 ml) and the resulting suspension filtered and the solid dried to give the bis-hydrochloride of compound IXA, M.P. 202–3° (d.).

This hydrochloride was dissolved in water (10 ml.) and the pH adjusted to 10.0 by the addition of aqueous sodium carbonate.

The resulting white solid was filtered washed with water and dried to give pure compound IXA, M.P. 140–142°.

Found: C, 68.09; H, 7.07; N, 6.44%. $C_{25}H_{32}O_5N_2$ requires, C, 68.17; H, 7.32; N, 6.36%.

(b) 6:7-dimethoxy-3:4-dihydroisoquinoline (15 g.) was dissolved in industrial methylated spirits (178 ml.) and ethanolic hydrogen chloride added to pH 5.8. Acetone dicarboxylic acid (5.89 g.) was added, followed by pyridine (15 ml.). Carbon dioxide was rapidly evolved and a white solid was precipitated. After ¾ hr. the latter was filtered off, washed with industrial methylated spirits and dried at room temperature in vacuo.

(c) 3:4-dihydro-6:7-dimethoxyisoquinoline hydrochloride (1.0 g.) was dissolved in industrial methylated spirit. (10 ml.) and acetone dicarboxylic acid (0.33 g.) followed by pyridine (1.0 ml.) added. The mixture was allowed to stand at room temperature for 2 hours during which time a solid separated from solution. Saturated ethanolic hydrogen chloride was added to bring the pH to 1.0, and the solid was then filtered, washed with cold industrial methylated spirit and dried to give pure compound IXA bis-hydrochloride 0.41 g. (37% theory) M.P. 201–2°, identical with the material obtained in method (a) above.

Found: C, 58.05; H, 6.62; H, 5.53; Cl, 13.52%.

$C_{25}H_{34}O_5N_2Cl_2$ requires C, 58.47; H, 6.57; N, 5.46; Cl, 13.81%.

EXAMPLE 3

*Preparation of the N:N-Butyryl Derivative of Compound IXB*

Pure compound IXB (10.92 g.) was dissolved in a mixture of anhydrous pyridine (33 ml.) and butyric anhydride (44 ml.). After standing at room temperature for 3 hours, the reaction mixture was poured into a solution of sodium carbonate (45 g.) in water (900 ml.) The oil initially precipitated solidified after standing (with occasional scratching) for 1 hour and the mixture was allowed to stand overnight at room temperature. The solid was filtered, washed with water, and dried to give the di-butyryl derivative of compound IXB, 12.55 g. (99% theory) M.P. 133–5°.

Found: C, 68.17; H, 7.43; N, 4.46%. $C_{33}H_{44}O_7N_2$ requires C, 68.27; H, 7.64; N, 4.83%.

Dry B precursor (13.71 g.) can also be converted directly to the di-butyryl derivative of compound IXB in exactly the same way to give 11.72 g., M.P. 133–5°.

EXAMPLE 4

*Preparation of Di-Butyryl Derivative of Compound IXA*

Pure compound IXA (0.25) was treated with butyric anhydride in pyridine exactly as for compound IXB to give 0.29 g. of the dibutyryl derivative M.P. 169–171°.

Found: C, 68.41; H, 7.46; N, 4.93%. $C_{33}H_{44}O_7N_2$ requires C, 68.27; H, 7.64; N, 4.83%.

EXAMPLE 5

*Conversion of Compound IXA Into Precursor of Compound IXB*

Compound IXA (1 g.) was added to a solution of conc. sulphuric acid (0.12 ml.) in water (12 ml.). The mixture was stirred and after 1 hour diluted with an equal volume of water. The suspension was allowed to stand for 20 hours at room temperature, filtered, washed with water and dried at room temperature in vacuo. The solid was shaken with methylene chloride (10 ml.) filtered off, and re-dried to a white powder.

Wt.=0.9 g. M.P. 131–142° (decomp.). Butyrylation of this material (0.25 g.) gave butyryl compound IXB (0.24 g.) M.P. 133–136°.

EXAMPLE 6

*The Preparation of Compound IX From 6:7-Dimethoxy-3:4-Dihydroisoquinoline and Acetone*

3:4-dihydro-6:7-dimethoxyisoquinoline hydrochloride (IX hydrochloride; 5.0 g.) was dissolved in industrial methylated spirit (10 ml.) and acetone (0.08 ml.) and pyridine (1.0 ml.) added. The mixture was allowed to stand at room temperature for 5 days, with occasional scratching. A white solid separated during this period. This was filtered, washed with industrial methylated spirits and dried at room temperature in vacuo to give 0.03 g. (4.8% theory) of compound IXA hydrochloride, M.P. 199–200°. Identity was proved by mixed M.P. and infrared spectrum.

EXAMPLE 7

*Preparation of 6:7-Dimethoxy-1:2:3:4-Tetrahydroisoquinol-1-Yl Acetone Hydrochloride*

(a) *From acetone.*—6.7 - dimethoxy-3:4-dihydroisoquinoline hydrochloride (0.5 g.) was dissolved in industrial methylate spirits (10 ml.) with pyridine (1 ml.) and acetone (10 ml.) The mixture was allowed to stand at room temperature for 3 days with occasional scratching. The yellow solution gradually became orange and deposited white crystals which were filtered off, washed with a little industrial methylated spirits and dried in vacuo at room temperature.

Wt.=0.33 g. (55%), M.P. 181–182° (decomp.).

(b) *From acetoacetic ester.*—Acetoacetic ester (4.48 ml.) was added to water (35 ml.) containing sodium hydroxide (1.39 g.). The mixture was allowed to stand at room temperature overnight and concentrated hydrochloric acid (2.56 ml.) added.

6:7-dimethoxy-3,4-dihydroisoquinoline (6 g.) was dissolved in methanol (12 ml.), water (13 ml.) was added and the two solutions were mixed together. The solution, after standing overnight at room temperature was treated with aqueous sodium carbonate solution to pH 10, extracted as usual with methylene chloride (3 x 50 ml.) and the extracts washed with water (3 x 100 ml.). Removal of the solvent in vacuo gave an orange oil (7.65 g.). This was dissolved in industrial methylated spirits (22 ml.) and ethanolic hydrogen chloride added to pH 1. On scratching and cooling, a pale solid separated which was filtered off, washed with a little industrial methylated spirits and dried at room temperature in vacuo.

Wt.=7.14 g. (ca. 80%), M.P. 184–185° (decomp.).

EXAMPLE 8

*Preparation of 1,3-Bis(1:2:3:4-Tetrahydro-6:7-Dimethoxy - 2(3-Oxo-But-1-Yl)-Isoquinol-1-Yl)Acetone Hydrochloride (Compound XII Hydrochloride)*

(a) *From compound IXA and methylvinyl ketone.*—Compound IXA (1 g.) in methylene chloride (25 ml.) was treated with methyl vinyl ketone (0.35 g.), and allowed to stand overnight at room temperature. The solvent was removed by distillation at room temperature in vacuo, and ether added and the solvent again evaporated to give a pink froth. This was dissolved in industrial methylated spirits (10 ml.) and ethanolic hydrogen chloride added to pH 1. An immediate white precipitate of the desired product was formed. After 1 hr. in the refrigerator, the white solid was filtered off, washed with industrial methylated spirits and dried at room temperature in vacuo.

Wt.=0.95 g., M.P. 185–186° (decomp.). Found: C, 57.74%; H, 7.05%; N, 3.92%; Cl, 9.87%.

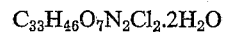

requires C, 57.47%; H, 7.31%; N, 4.06%; Cl, 10.28%.

The free base had M.P. 105–7° C. Found: C, 67.79; H, 7.64; N, 5.11. $C_{33}H_{44}O_7N_2$ requires C, 68.25; H, 7.63; N, 4.82%.

(b) *From compound IXB and methylvinyl ketone.*—Compound IXB (1 g.) in methylene chloride (25 ml.) was treated with methyl vinyl ketone (0.7 g.) and the reaction mixture treated as in (a) above. 0.38 g. of the hydrochloride M.P. 184–186° (decomp.) derived from compound IXA was obtained.

From the mother liquors a fine white solid separated on standing in the refrigerator overnight. This was filtered off, washed with industrial methylated spirits/ether and dried at room temperature in vacuo.

Wt.=0.75 g., M.P. 121–124° (decomp.). Found: C, 53.39%; H, 7.34%; N, 3.60%; Cl, 10.16%.

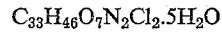

requires: C, 53.29%; H, 7.60%; N, 3.77%; Cl, 9.54%.

EXAMPLE 9

*Preparation of 1:2:3:4-Tetrahydro-6:7-Dimethoxy-2-(3-Oxo-But-1-Yl)-Iso-Quinol-1-Yl Acetone Hydrochloride*

1:2:3:4 - tetrahydro-6:7-dimethoxy-isoquinol-1-yl acetone (1.24 g.) was dissolved in methylene chloride (25 ml.) with methyl vinyl ketone (0.35 g.), and allowed to stand overnight at room temperature. Evaporation of the solvent at room temperature in vacuo, followed by treatment with ether and removal of the solvent gave a pale yellow froth. This was dissolved in industrial methylated spirit (15 ml.) and alcoholic hydrogen chloride added to pH 1. The mixture was diluted with ether (90 ml.) and industrial methylated spirits added till the gumminess in the precipitate was discharged. The mixture was allowed to stand in the refrigerator with scratching overnight when the solid was removed by filtration, washed with ether and dried at room temperature in vacuo.

Wt.=1.01 g., M.P. 65–68°. Found: C, 52.43%; H, 8.06%; N, 4.06%. $C_{18}H_{26}O_4NCl.3H_2O$ requires C, 52.62%; H, 7.85%; N, 3.41%.

EXAMPLE 10

*Preparation of 3-Acetyl-1:2:3:4:6:7-Hexahydro-11b[H]-9:10-Dimethoxy-2-Methyl - Benzo-[a]-Quinolizine-2-Ol Hydrochloride*

(a) *Sodium methoxide cyclisation.*—1:2:3:4-tetrahydro-6:7-dimethoxy-2-(3-oxobutyl)-isoquinol-1-yl acetone hydrochloride (1 g.) was converted into the free base by treatment with aqueous sodium carbonate solution. This was dissolved in benzene (30 ml.) and a solution of sodium methoxide (0.3 g.) in methanol (5 ml.) and industrial methylated spirits (2 ml.) added. The mixture was shaken overnight at room temperature when a pale orange solution was obtained. This was washed with water (3 x 25 ml.), the washed being back-extracted with benzene (20 ml.). The benzene was removed in vacuo and the residue was dissolved in industrial methylated spirits. (10 ml.). Ethanolic hydrogen chloride was added to pH 1 and a white solid rapidly separated on scratching. After 1 hour in the refrigerator this was filtered off, washed with industrial methylated spirits and dried at room temperature in vacuo.

Wt.=0.6 g., M.P. 235–236° (decomp.).

(b) *Cyclisation with hydrochloric acid.*—1:2:3:4-tetrahydro-6:7-dimethoxy-isoquinol-1-yl acetone (2.68 g.) was dissolved in benzene (50 ml.) and methyl vinyl ketone (0.7 g.) added. The mixture was allowed to stand overnight at room temperature before the solvent was removed. The residue was taken up in industrial methylated spirits (50 ml.) and ethanolic hydrogen chloride (~2 ml.) added. After ca. 30 min. crystals began to separate and the process was completed by a further standing for 2 hours in the refrigerator. The crystals were filtered off and dried in vacuo at room temperature.

Wt.=1.84 g., M.P. 231° (decomp.). Found: C, 60.6%; H, 7.56%. $C_{18}H_{26}O_4NCl$ required C, 60.8%; H, 7.4%.

The hydrochloride was basified with 1 N sodium hydroxide solution to give a red oil. This was dissolved in a small amount of ether and reduced to a small volume by evaporation in vacuo without heating. On scratching a pink solid separated. This was filtered off (M.P. 101.5–102°) and recrystallised from ether/petroleum ether (B.P. 40–60°) to give a pink crystalline solid M.P. 103.5–104.5°.

Found: C, 67.26%; H, 8.06%; N, 4.53%. $C_{18}H_{25}O_4N$ requires C, 67.7%; H, 7.9%; N, 4.3%.

EXAMPLE 11

*Self-Condensation of $1^1$:$3^1$-Bis(2-Butyryl-1:2:3:4-Tetrahydro-6:7-Dimethoxyisoquinol-1-Yl) Acetone (Compound X)*

Dibutyryl compound IX (16.1 g.) in dry benzene (250 ml.) was added to a solution of sodium (3.2 g.:5.0 mol.) in dry ethanol, (ca. 50 ml.) and the mixture was refluxed under nitrogen for 5 hours. When cool the solution was diluted with benzene and washed successively with water, 2 N-hydrochloric acid, and water. The dried solution ($MgSO_4$), on evaporation at diminished pressure, afforded a yellow glass (13.2 g.), which was dissolved in a small volume of benzene and adsorbed on alumina (P. Spence (grade H), 800 g.), which had previously been neutralized and deactivated by the dropwise addition of 10% aqueous acetic acid (40 ml.) to a stirred suspension in benzene. The chromatogram was eluted successively with benzene (fractions 1–11), 5% ethyl acetate-benzene (F. 12–46), 10% ethyl acetate-benzene (F. 47–55), 15% ethyl acetate-benzene (F. 56–86), 20% ethyl acetate-benzene (F. 87–102), 40% ethyl acetate-benzene (F. 103–130), and finally with ethyl acetate (F. 131–145).

Fractions 10–70 (6.7 g.) contained mainly non-ketonic material, which on fractional trituration with ether and recrystallisation from ethyl acetate afforded 3-ethyl-1:4:6:7 - tetrahydro-9:10-dimethoxy-2-(2'-butyryl-1':2':3':4'-tetrahydro-6':7'-dimethoxyisoquinol-1'-yl) methyl-4-oxo-11bH-benzo[a]quinolizine (compound XI) M.P. 202–203° from ethanol. (Found: C, 70.08; H, 7.62; N, 5.09. $C_{33}H_{42}N_2$ requires C, 70.45; H, 7.53; N, 4.98%.) U.V. maximum (EtOH) at 281 mμ (ε=9800) and minimum at 285.5 mμ (ε=5700), and a smaller yield of the more soluble 3-ethyl-2:3:6:7-tetrahydro-9:10-dimethoxy-2 - (2'-butyryl-1':2':3':4'-tetrahydro-6':7'-dimethoxyisoquinol-1'-yl)methyl-4-oxo-4H-benzo[a]quinolizine (compound XIA) M.P. 167–168.5° (ex. ethyl acetate). (Found: C, 70.57, 70.31; H, 7.23, 7.29; N, 5.23, 5.19; $C_{33}H_{42}O_6N_2$ requires C, 70.45; H, 7.53; N, 4.98%.) U.V. maxima (EtOH) at 250 mμ, 280 mμ, 290 mμ (shoulder) and 310 mμ (ε=16600, 12600, 11700, and 9400).

Fractions 70 to 98 (2.95 g.) consisted mainly of unchanged dibutyrylketone contaminated with a small proportion of the α:β-unsaturated amide.

Fractions 99 to 109 (0.71 g.) contained 3-ethyl-1:2:3:4:6:7 - hexahydro-2-hydroxy-9:10-dimethoxy-2(2'-butyryl - 1':2':3':4'-tetrahydro-6':7'-dimethoxyisoquinol-1'-yl) methyl-4-oxo-11bH-benzo[a]quinolizine, compound XIB, M.P. 206–208° (ex. ethyl acetate). (Found: C, 68.58; H, 7.62; N, 4.86. $C_{33}H_{44}O_7N_2$ requires C, 68.27; H, 7.64; N, 4.83%.) U.V. maximum (EtOH) at 282.5 mμ (ε=8,000).

Fractions 110 to 145 (1.40 g.) contained 3-ethyl-6:7-dihydro - 9:10 - dimethoxy-4-oxo-2(2'-β'-butyrylaminoethyl - 4':5'-dimethoxy-β-phenethyl)-4H-benzo[a]quinolizine, M.P. 174–175° (ex. ethyl acetate). (Found: C, 70.20, 70.34; H, 7.57, 736; N, 5.11, 4.8%. Mol. wt. 584, 539. $C_{33}H_{42}O_6N_2$ requires C, 70.43; H, 7.53; N, 4.98%. Mol. wt. 562.) U.V. maxima (EtOH) at 268 mμ, 283 mμ (inflexion) and 347 mμ (ε=11,000, 6,200, and 22,000).

The γ:δ-unsaturated amide (III) became the major condensation product at higher reflux temperatures (e.g. toluene), or with longer reaction times, e.g. 3 days) or when potassium t-butoxide was employed as the condensing agent.

EXAMPLE 12

*3-Acetyl-1,4,6,7-Tetrahydro-9,10-Dimethoxy-2-Methyl-11b[H]-Benzo[a]-Quinolizine*

VIII, R=H, $R^1$=$CH_3$; $R^4$=Et

3 - acetyl - 1,2,3,4,6,7-hexahydro-11b[H]-9,10-dimethoxy - 2 - methylbenzo-[a]-quinolizine-2-ol hydrochloride (2.6 g.) was dissolved in concentrated hydrochloric acid. After 3 hours at room temperature and 1 hour at 100° C., the mixture was cooled, neutralized with potassium carbonate, and the base extracted with benzene. The residual gum obtained on evaporation of the solvent was dissolved in ethanol and treated with ethanolic hydrogen chloride. The hydrochloride separated on cooling overnight.

Wt.=1.17 g. M.P. 221° C. Found: C, 63.81; H, 7.48; N, 3.90; Cl, 9.92. $C_{18}H_{24}O_3NCl$ requires C, 64.01; H, 7.16; N, 4.15; Cl, 10.50%.

U.C. in ethanol λ max. 232 mμ $E^{1\%}_{1cm.}$=484, 281 mμ $E^{1\%}_{1cm.}$=116.

EXAMPLE 13

*3 - Acetyl-1,2,3,4,6,7-Hexahydro-2-Hydroxy-9,10-Dimethoxy - 2 - [1,2,3,4-Tetrahydro-6,7-Dimethoxy-2-(3-Oxobutyl) - Isoquinol-1-Methyl]-11b[H]Benzo-[a]-Quinolizine (Compound XIIIa)*

B series.—Compound (XIIB) hydrochloride (15.0 g.) was converted to the free base with aqueous sodium carbonate. To a dried benzene solution (375 ml.) of the base at room temperature was added with stirring a solution of sodium methoxide in methanol [prepared from sodium (0.63 g.) in methanol (20 ml.)]. After 15 mins. at room temperature, the reaction mixture was diluted with water and extracted with benzene. The benzene extracts were washed with water, dried (MgSO$_4$) and evaporated to dryness. Trituration of the residual gun with ether gave a solid (7.24 g.). This is essentially cyclic alcohol B contaminated with some A isomer. Treatment of the mixture in ethanol with hydrogen chloride precipitated the A isomer hydrochloride (see below). Addition of ether to the mother liquors gave the B isomer hydrochloride (5.75 g.) M.P. 192–3°. Found: C, 56.27; H, 7.32; N, 3.74; Cl, 10.22. $C_{33}H_{46}O_7N_2Cl_2 \cdot 3H_2O$ requires C, 56.00; H, 7.41; N, 3.96; Cl, 10.02%.

The free base had M.P. 156–8° C. Found: C, 68.25; H, 7.99; N, 5.03. $C_{33}H_{44}O_7N_2$ requires C, 68.25; H, 7.63; N, 4.82%.

*A series.*—Compound (XIIA) hydrochloride (12.0 g.) was treated exactly as above. The hydrochloride of cyclic alcohol A (4.8 g.) crystallised from ethanol, M.P. 198–9° C. Found: C, 58.84; H, 7.29; N, 4.32; Cl, 10.43.

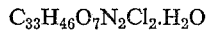

requires, C, 59.01; H, 7.24; N, 4.02; Cl, 10.56%.

The free base had M.P. 160–2° C. Found: C, 68.05; H, 7.72; N, 4.98. $C_{33}H_{44}O_7N_2$ requires C, 68.25; H, 7.63; N, 4.82%.

EXAMPLE 14

*3 - Acetyl-1,4,6,7-Tetrahydro-9,10-Dimethoxy-2-[1,2,3,4-Tetrahydro - 6,7-Dimethoxy-2-(3-Oxobutyl)-Isoquinol-1-Methyl]-11b[H]-Benzo-[a]-Quinolizine (XIII)*

*B series.*—Cyclic alcohol B hydrochloride (10.31 g.) was heated at 100° C. for 3 hrs. in 11 N-sulphuric acid (52 ml.). The cooled solution was basified with potassium carbonate, and the base extracted into benzene. The gum obtained on evaporation of the benzene solution was dissolved in N-hydrochloric acid (50 ml.) and treated with potassium iodide (8.5 g.) in water (15 ml.). The hydroiodide of the product separated as a yellow powder, 9.05 g. M.P. 190° C. (d.).

Found: C, 47.58; H, 5.64; N, 3.07; I, 29.61.

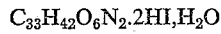

requires C, 47.39; H, 5.54; N, 3.35; I, 30.34%.

*A series.*—Cyclic alcohol A hydrochloride (6.59 g.) was dehydrated in 11 N-sulphuric acid as above. In this case, trituration of the gum remaining after evaporation of the benzene with ether gave the free base, 4.5 g., M.P. 131–2° C.

Found: C, 68.13; H, 7.64; N, 4.86. $C_{33}H_{42}O_6N_2 \cdot H_2O$ requires C, 68.25; H, 7.63; N, 4.82%.

The hydrochloride has M.P. 185° C. (d.). Found: C, 60.59; H, 7.03; N, 3.48; Cl, 10.14.

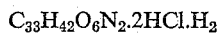

requires C, 60.64; H, 7.09; N, 4.29; Cl, 10.85%.

EXAMPLE 15

*6:7-Dimethoxy-1,2,3,4-Tetrahydro-Isoquinol-1-yl-Acetoacetic Acid*

6,7-dimethoxy-3,4-dihydroisoquinoline (24 g.) was dissolved in methanol (48 ml.) and water (192 ml). The mixture was cooled to below room temperature in cold water, and a solution of acetone dicarboxylic acid (18.5 g.) in water (48 ml.) added. After 2½ hr. with continuous cooling and occasional shaking the fine white solid was filtered, washed with water, industrial methylated spirits and finally with ether. After drying in vacuo at room temperature, the product weighed 19.2 g. M.P. 101–3° (decomp.). (Found: C, 60.92; H, 6.56; N, 4.57. $C_{15}H_{19}O_5N$ requires C, 61.42; H, 6.53; N, 4.78%.)

We claim:
1. A compound of the formula

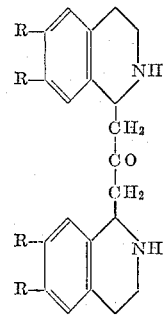

in which R is lower alkoxy.

2. 1,3-bis-(6,7-dimethoxy-1,2,3,4-tetrahydroisoquinol-1-yl) acetone.

3. A process for the preparation of 1-substituted 1,2,3,4-tetrahydroisoquinolines in which a 3,4-dihydroisoquinoline compound is reacted with a compound of the formula R''—CH$_2$—CO—R''' where R'' is a member selected from the group consisting of a carboxyl group, a lower carbalkoxy group, an acetyl group and a hydrogen atom and R''' is a member selected from the group consisting of a methyl group, an ethyl group, a carboxymethyl group, a carboxymethyl ester group and, when R'' is other than hydrogen, a lower alkoxy group and a hydroxy group.

4. A process as claimed in claim 2 in which said compound reacted with said 3,4-dihydroisoquinoline compound is acetone.

5. A process as claimed in claim 2 in which said compound reacted with said 3,4-dihydroisoquinoline compound is acetone dicarboxylic acid.

6. A process as claimed in claim 2 in which said compound reacted with said 3,4-dihydroisoquinoline compound is acetoacetic acid.

7. The process of claim 2 in which the reaction is carried out in the presence of an acid catalyst.

References Cited in the file of this patent

FOREIGN PATENTS 798,847  Great Britain _____ July 30, 1958

OTHER REFERENCES

Oberlin: Aschiv der Pharmazie, vol. 265, pp. 274–278 (1927).

Brossi et al.: Helv. Chima Acta, vol. 41, pp. 119–139.

Brosi et al.: Helv. Chima Acta, vol. 42 (1959), pp. 772–7788.